US012743449B1

(12) United States Patent
Iyoob et al.

(10) Patent No.: US 12,743,449 B1
(45) Date of Patent: Sep. 22, 2026

(54) AUTOMATIC DEVELOPMENT OF ENHANCED ARTIFICIAL PROMPTS

(71) Applicant: Kyndryl, Inc., New York, NY (US)

(72) Inventors: Ilyas Iyoob, Pflugerville, TX (US); Cesar Augusto Rodriguez Bravo, Alajuela (CR); Venkatapurna Parthasarathy Madhira, Frisco, TX (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 19/185,382

(22) Filed: Apr. 22, 2025

(51) Int. Cl.
*G06F 16/332* (2019.01)
*G06F 16/3332* (2025.01)
*G06F 40/30* (2020.01)

(52) U.S. Cl.
CPC ...... *G06F 16/3323* (2019.01); *G06F 16/3338* (2019.01); *G06F 40/30* (2020.01)

(58) Field of Classification Search
None
See application file for complete search history.

(56) References Cited

U.S. PATENT DOCUMENTS 11,516,158 B1 11/2022 Luzhnica et al.
2007/0038634 A1* 2/2007 Glover .................. G06F 16/954
2014/0344263 A1* 11/2014 Dhamdhere ........ G06F 16/3338 707/E17.084
2023/0252224 A1 8/2023 Tran
2024/0281457 A1 8/2024 De Witte et al.
2024/0296293 A1 9/2024 Tsun et al.
2024/0311618 A1* 9/2024 Sukhavasi ............ G06N 3/0455
2024/0320476 A1* 9/2024 Chandrasekaran .... G06N 20/00
2025/0157106 A1* 5/2025 Paga ....................... G06T 11/60

OTHER PUBLICATIONS

Cheng et al., "Prompt Sapper: A LLM-Empowered Production Tool for Building AI Chains", ACM Transactions on Software Engineering and Methodology, vol. 33, No. 5, Article 124, Jun. 2024, 24 pages.

* cited by examiner

*Primary Examiner* — Yu Zhao
(74) *Attorney, Agent, or Firm* — CANTOR COLBURN LLP; Erik Swanson

(57) ABSTRACT

Embodiments relate to providing automatic development of enhanced artificial prompts for artificial intelligence (AI) engines. Aspects include receiving a user prompt and using, natural language processing, to identify at least one intent in the user prompt and at least one entity in the user prompt. Aspects include enhancing the at least one entity with enhancements and inputting the user prompt, the at least one intent, the at least one entity, and the enhancements into an internal language model in order to output artificial prompts. The artificial prompts are presented in order to receive a selected artificial prompt of the artificial prompts, the selected artificial prompt being configured for input to the AI engine.

20 Claims, 8 Drawing Sheets

100
Mass Storage 110
Hard Disk 108
Software 111
I/O Adapter 106
Network 112
Communications Adapter 107
System Bus 102
System Memory 103
RAM 105
ROM 104
CPU 101a
CPU 101b
CPU 101c
101
Interface Adapter 116
Display Adapter 115
Display 119
Microphone 124
Speaker 123
Mouse 122
Keyboard 121

200
COMPUTER SYSTEM 202
(INTERMEDIARY) SOFTWARE 204
MANUAL EXTRACTION MODULE 262
NLP 210
INTERNAL LLM 272
SENTIMENT ANALYSIS 274
ARTIFICIAL PROMPTS 264
INTERNAL DATA 286
TRAINING DATA 270
250
COMPUTER SYSTEMS 240A
AI ENGINE 244A
COMPUTER SYSTEMS 240B
AI ENGINE 244B
COMPUTER SYSTEMS 240N
AI ENGINE 244N
254
256
258
USER DEVICE 252
220

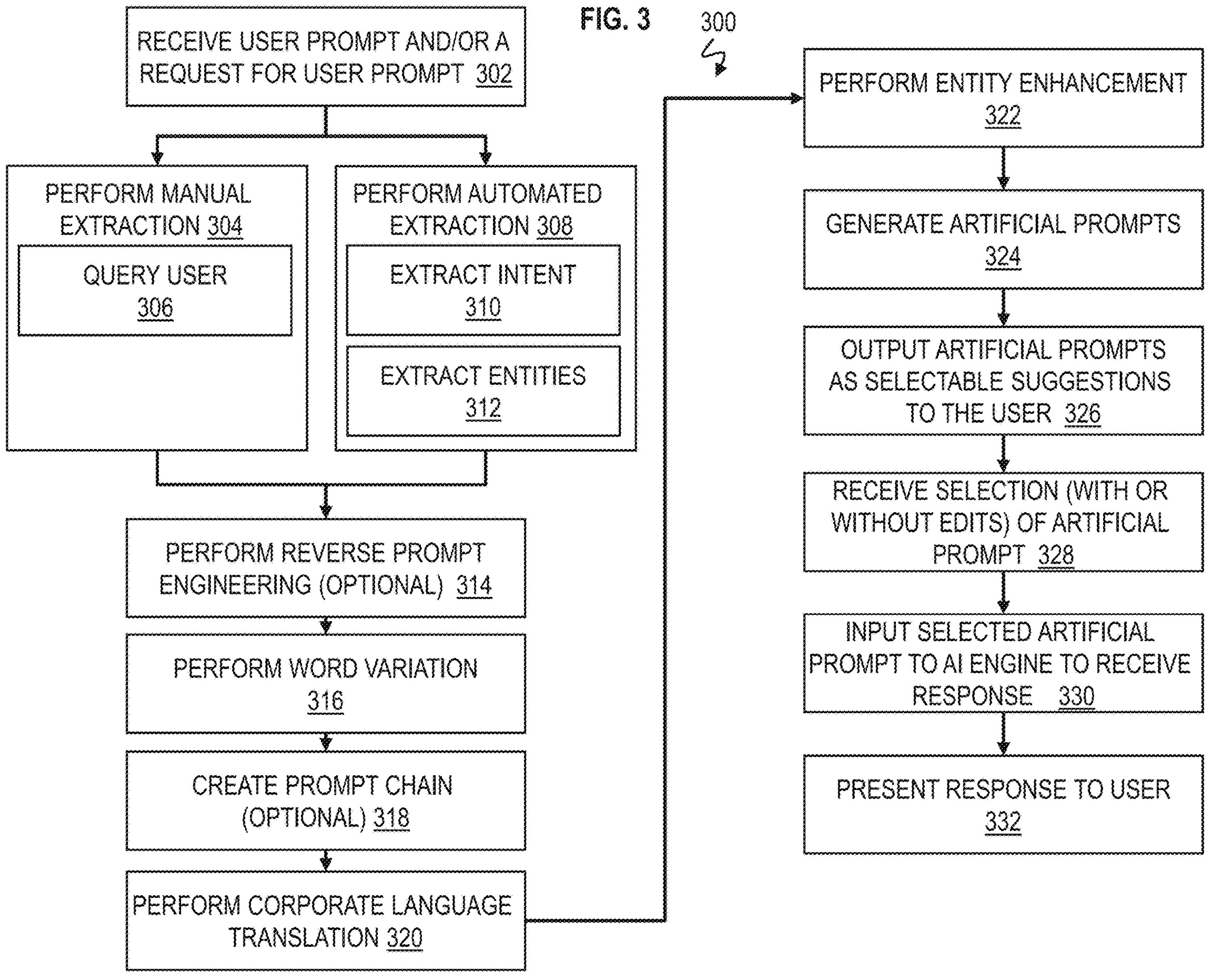
FIG. 3
300
RECEIVE USER PROMPT AND/OR A REQUEST FOR USER PROMPT 302
PERFORM MANUAL EXTRACTION 304
QUERY USER 306
PERFORM AUTOMATED EXTRACTION 308
EXTRACT INTENT 310
EXTRACT ENTITIES 312
PERFORM REVERSE PROMPT ENGINEERING (OPTIONAL) 314
PERFORM WORD VARIATION 316
CREATE PROMPT CHAIN (OPTIONAL) 318
PERFORM CORPORATE LANGUAGE TRANSLATION 320
PERFORM ENTITY ENHANCEMENT 322
GENERATE ARTIFICIAL PROMPTS 324
OUTPUT ARTIFICIAL PROMPTS AS SELECTABLE SUGGESTIONS TO THE USER 326
RECEIVE SELECTION (WITH OR WITHOUT EDITS) OF ARTIFICIAL PROMPT 328
INPUT SELECTED ARTIFICIAL PROMPT TO AI ENGINE TO RECEIVE RESPONSE 330
PRESENT RESPONSE TO USER 332

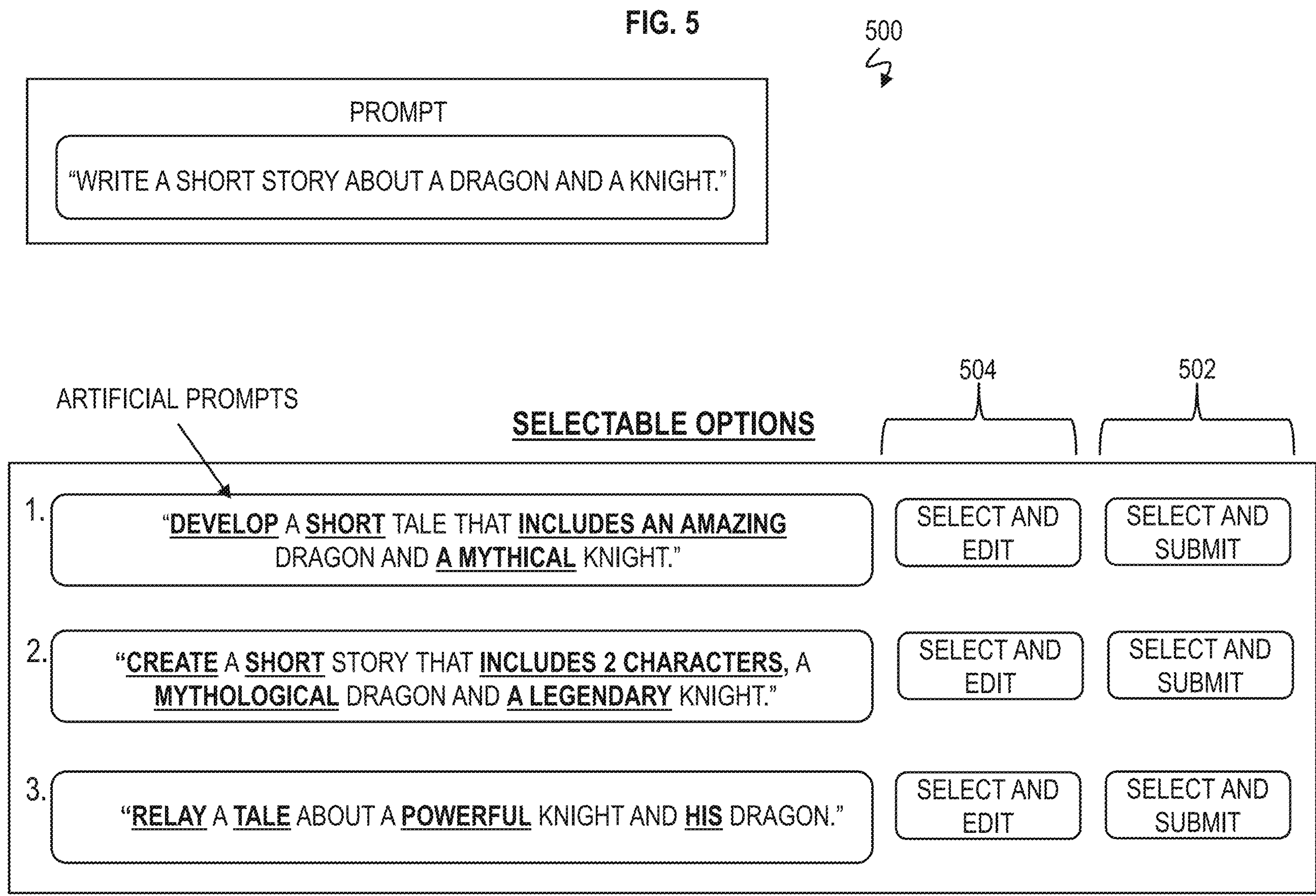
FIG. 5
500
PROMPT
"WRITE A SHORT STORY ABOUT A DRAGON AND A KNIGHT."
ARTIFICIAL PROMPTS
SELECTABLE OPTIONS
504
502
1. "DEVELOP A SHORT TALE THAT INCLUDES AN AMAZING DRAGON AND A MYTHICAL KNIGHT."
SELECT AND EDIT
SELECT AND SUBMIT
2. "CREATE A SHORT STORY THAT INCLUDES 2 CHARACTERS, A MYTHOLOGICAL DRAGON AND A LEGENDARY KNIGHT."
SELECT AND EDIT
SELECT AND SUBMIT
3. "RELAY A TALE ABOUT A POWERFUL KNIGHT AND HIS DRAGON."
SELECT AND EDIT
SELECT AND SUBMIT

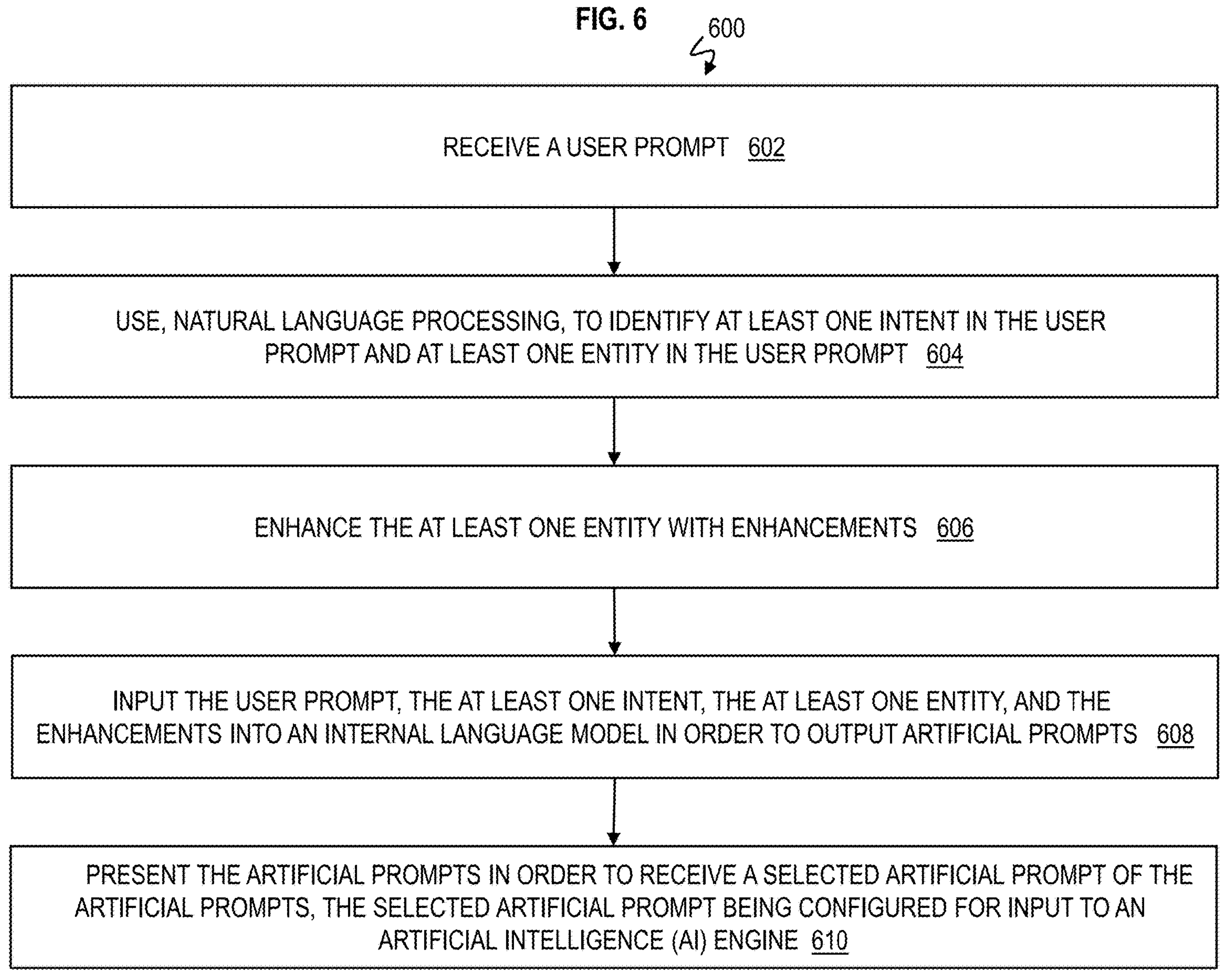
FIG. 6
600
RECEIVE A USER PROMPT 602
USE, NATURAL LANGUAGE PROCESSING, TO IDENTIFY AT LEAST ONE INTENT IN THE USER PROMPT AND AT LEAST ONE ENTITY IN THE USER PROMPT 604
ENHANCE THE AT LEAST ONE ENTITY WITH ENHANCEMENTS 606
INPUT THE USER PROMPT, THE AT LEAST ONE INTENT, THE AT LEAST ONE ENTITY, AND THE ENHANCEMENTS INTO AN INTERNAL LANGUAGE MODEL IN ORDER TO OUTPUT ARTIFICIAL PROMPTS 608
PRESENT THE ARTIFICIAL PROMPTS IN ORDER TO RECEIVE A SELECTED ARTIFICIAL PROMPT OF THE ARTIFICIAL PROMPTS, THE SELECTED ARTIFICIAL PROMPT BEING CONFIGURED FOR INPUT TO AN ARTIFICIAL INTELLIGENCE (AI) ENGINE 610

AUTOMATIC DEVELOPMENT OF ENHANCED ARTIFICIAL PROMPTS

BACKGROUND

The present invention generally relates to computer systems, and more specifically, to computer-implemented methods, computer systems, and computer program products configured and arranged to provide automatic development of enhanced artificial prompts for artificial intelligence (AI) engines.

AI is in the field of computer science relating to the development of computer systems for performing tasks that typically require human intelligence, such as speech recognition, natural language processing (NLP), text generation and translation, video, sound, and image generation, decision making, planning, and more. In general, AI refers to the development of intelligent systems that can mimic human behavior and decision-making processes. AI encompasses techniques and approaches enabling machines to perform tasks, analyze visual and textual data, and respond or adapt to their environment. One of the benefits of artificial intelligence is its ability to process large amounts of data and find patterns in it. As such, AI tools are designed to make decisions or take actions based on that knowledge.

An AI prompt may be a question, command, or statement used to interact between a human and the AI model such as a large language model that allows the AI model to produce the intended output. The purpose of the prompt is to provide the AI model with enough information so that it can produce an output relevant to the prompt.

SUMMARY

Embodiments of the present invention are directed to computer-implemented methods for automatic development of enhanced artificial prompts for artificial intelligence (AI) engines. A non-limiting computer-implemented method includes receiving a user prompt and using, natural language processing, to identify at least one intent in the user prompt and at least one entity in the user prompt. The method includes enhancing the at least one entity with enhancements and inputting the user prompt, the at least one intent, the at least one entity, and the enhancements into an internal language model in order to output artificial prompts. The method includes presenting the artificial prompts in order to receive a selected artificial prompt of the artificial prompts, the selected artificial prompt being configured for input to an AI engine.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts a flowchart of a computer-implemented method for automatically developing artificial prompts, by generating the artificial prompts based on a user prompt, presenting the artificial prompts to the user as selectable options, causing the selected artificial prompt to be executed by AI engines, and/or presenting the responses of the AI engines to the user according to one or more embodiments of the present invention;

FIG. 5 depicts a block diagram of an example user interface displaying selectable options of artificial prompts according to one or more embodiments of the present invention;

FIG. 6 depicts a flowchart of a computer-implemented method according to one or more embodiments of the present invention;

DETAILED DESCRIPTION

Figure 1:
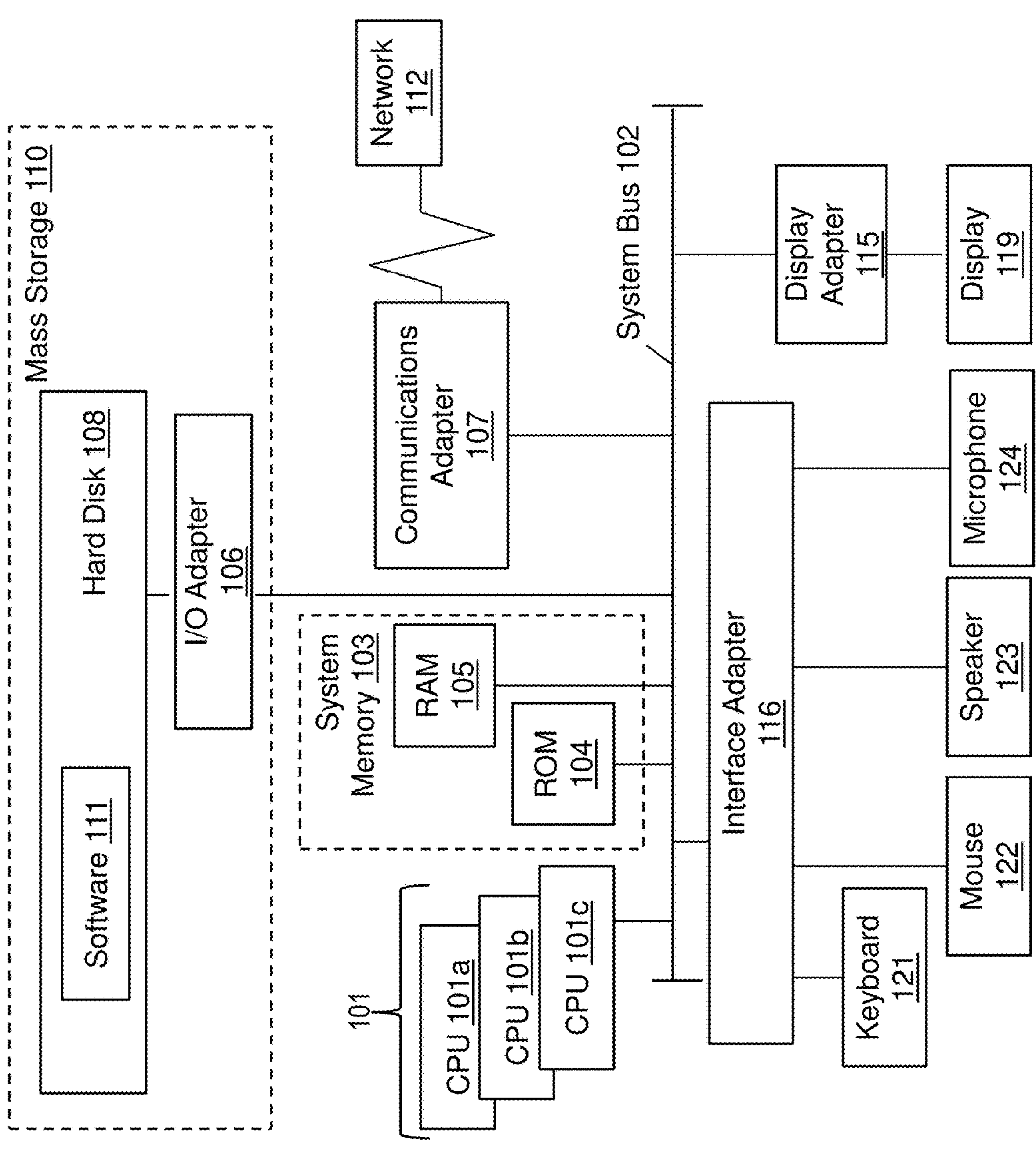
FIG. 1 depicts a block diagram of an example computer system for use in conjunction with one or more embodiments of the present invention.

One or more embodiments are configured and arranged to dynamically provide automatic development of enhanced artificial prompts for artificial intelligence (AI) engines. Upon acceptance or selection of the artificial prompt, one or more embodiments can cause the artificial prompt to be executed by AI engines on behalf of a user. The output of the AI engines are presented to the user.

With the incorporation of artificial intelligence in the information technology (IT) practices of organizations or enterprises, there is a desire to leverage prompts for the benefit of organizations or enterprises (e.g., in the workplace). While AI models are great tools, some users may not be leveraging the full potential of these tools because of the lack of experience. The problem is that novice or unexperienced users may tend to send several prompts to AI models before receiving a response that is a satisfactory result. In some cases, the present disclosure recognizes that an unexperienced user may send ten or more prompts before obtaining the desired response. This can be because their first prompts are too basic and lack the necessary information to produce the desired result.

In addition to producing a poor user experience, this also impacts the organization or enterprises with increased costs by having to submit several prompts until a satisfactory result is received, and this results in decreased efficiency by having the user spend time repeatedly sending and creating new prompts. Accordingly, one or more embodiments provide a novel method and system to support the user by automatically creating a robust artificial prompt before submitting the request (with the artificial prompt) to the AI model.

The present disclosure provides various technical effects and technical solutions. By automatically recommending an artificial prompt to the user, the system provides the user with an improved user experience on the user device even if the user lacks familiarity with prompt creation. Also, the system can automatically execute actions on behalf of the user by inputting the artificial prompt to an AI engine for execution and providing the output of the AI engine to the user. By providing the user with a recommended artificial prompt based on techniques discussed in embodiments, this can prevent numerous prompt attempts that fail to generate the appropriate/correct output from the AI engine, thereby reducing computer processor usage (e.g., reducing CPU usage), reducing memory usage, reducing network bandwidth (e.g., reducing the amount of back and forth communications (and input/output operations) between the user device and the AI engine), reducing time, etc.

One or more embodiments described herein can utilize machine learning techniques to perform tasks, such as classifying a feature of interest. More specifically, one or more embodiments described herein can incorporate and utilize rule-based decision making and artificial intelligence reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks in nature. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program products and the execution of such instruction are discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
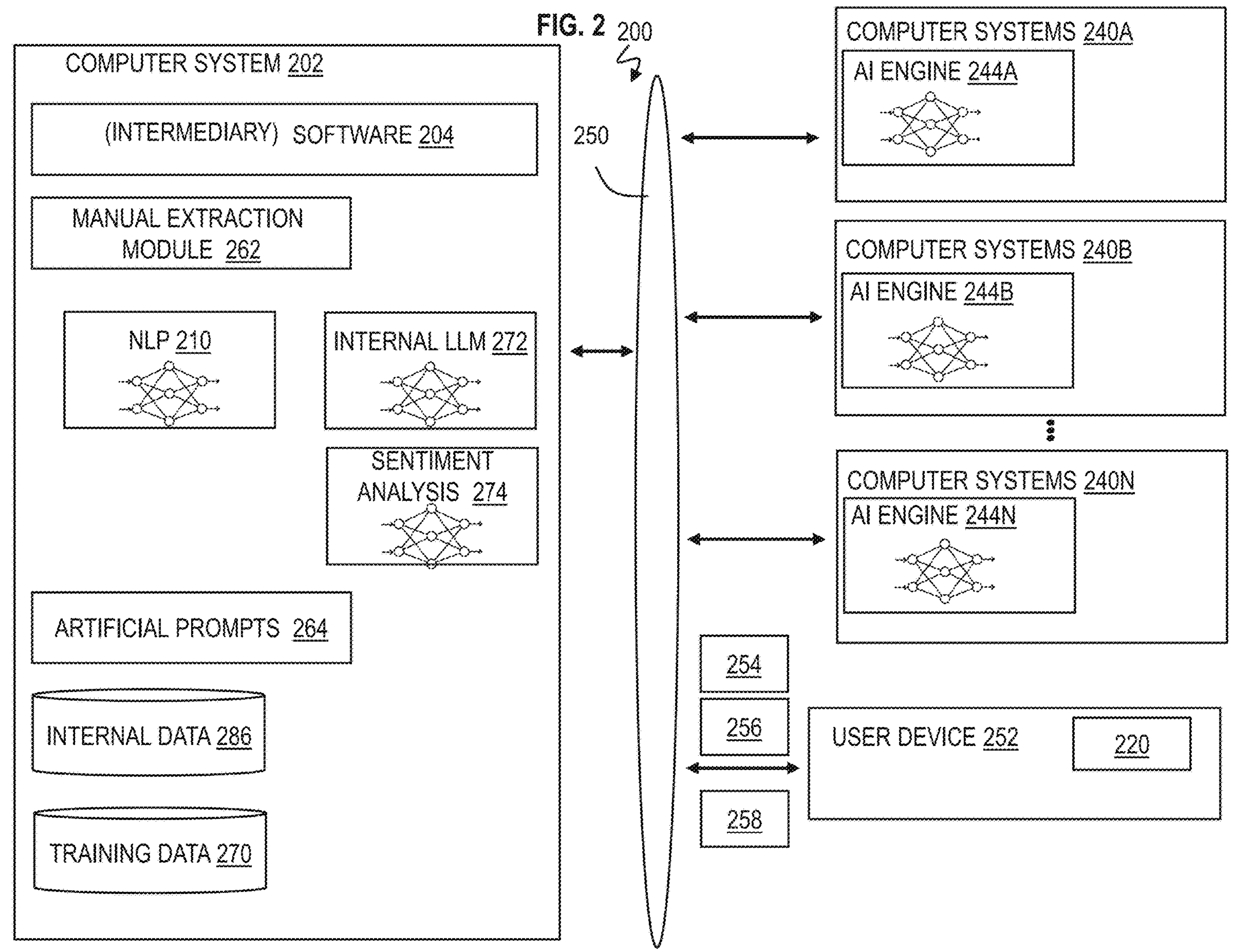
FIG. 2 depicts a block diagram of an example system configured to automatically develop artificial prompts, by generating the artificial prompts based on a user prompt, presenting the artificial prompts to the user as selectable options, causing the selected artificial prompt to be executed by AI engines, and/or presenting the responses of the AI engines to the user according to one or more embodiments of the present invention.

FIG. 2 depicts a block diagram of an example system 200 configured to automatically develop artificial prompts for artificial intelligence (AI) engines on behalf of a user, by generating the artificial prompts based on a user prompt (or request), presenting the artificial prompts to the user as selectable options, causing the selected artificial prompt to be executed by AI engines, and/or presenting the responses of the AI engines to the user. The system 200 includes a computer system 202 configured to communicate over a network 250 with many different computer systems, such as a computer system 240A, a computer system 240B, through a computer system 240N. The computer system 240A, the computer system 240B, through the computer system 240N can generally be referred to as computer systems 240.

The computer system 202 is configured to communicate over the network 250 with various user devices, such as a user device 252 of a user as well as other user devices (not shown). The user device 252 can be a personal computer or laptop. The user device 252 can be a mobile device such as a cellular phone or tablet or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The network 250 can be a wired and/or wireless communication network, and the communication network includes a telecommunications network, the public switched telephone network (PTSN), voice over IP (VOIP) network, etc. The communication network includes cellular networks, satellite networks, etc.

The computer system 202, computer systems 240, and user device 252 can include various software and hardware components including software applications (apps) for communicating over the network 250 as understood by one of ordinary skill in the art. The computer systems 240A, 240B, and 240N can include AI engines 244A, 244B, and 244N, respectively to provide AI services. The AI engines 244A, 244B, and 244N can generally be referred to as AI engines 244. In one or more embodiments, the computer system 202 may include an internal large language model (LLM) 272, which is internal to the organization hosting the LLM 272 and access to the LLM 272 is restricted. The user device 252 can include user software 220 to capture user prompts and recommend artificial prompts. The user software 220 is in communication with the software 204 of the computer system 202. In one or more embodiments, the user software 220 may be representative of client software in a server-client relationship. For example, the user software 220 may be a thin client. The user software 220 may be an application installed on the user device 252 and/or coupled to the user device 252 for access by users. In one or more embodiments, the user software 220 may include a user interface in which prompts can be input by users for execution by AI engines and artificial prompts can be recommended to and selected by the user (as depicted in FIG. 5). The user software 220 may include plugins, portals, webpages, remote connection software, etc., for access by the user in accordance with one or more embodiments. In one or more embodiments, the user selects an option to authorize the user software 220 to execute on the user device 252. The execution of the user software 220 generates an interactive user experience for the user by recommending artificial prompts for AI engines 244 for selection by the user. In one or more embodiments, the user software 220 and/or computer system 202 can automatically input the artificial prompts to the AI engines 244 and provide the output (e.g., response) to the user.

The computer system 202, computer systems 240, user device 252, software 204, user software 220, etc., can include functionality and features of the computer system 100 in FIG. 1 including various hardware components and various software applications such as software 111 which can be executed as instructions on one or more processors 101 in order to perform actions according to one or more embodiments of the invention. The software 204 and user software 220 can include, be integrated with, and/or call other pieces of software, algorithms, application programming interfaces (APIs), graphical user interfaces (GUIs), etc., to operate as discussed herein.

The computer system 202 may be representative of numerous computer systems and/or distributed computer systems configured to provide AI prompt recommendation services to user of the user device 252. The computer system 202 can be part of a cloud computing environment such as a cloud computing environment 50 depicted in FIG. 7, as discussed further herein.

AI engines may use generative artificial intelligence which is a type of AI that can create new content and ideas, including conversations, stories, images, videos, and music. AI technologies attempt to mimic human intelligence in nontraditional computing tasks like image recognition, natural language processing (NLP), and translation. AI engines are trained to learn human language, programming languages, art, chemistry, biology, or any complex subject matter. AI engines reuse training data to solve new problems. An organization can use AI engines for various purposes. Like any artificial intelligence, an AI engine works by using machine learning models such as very large models that are pretrained on vast amounts of data. Examples of very large models can include foundation models and large language models.

Foundation models: Foundation models (FMs) are machine learning models trained on a broad spectrum of generalized and unlabeled data. Foundation models are capable of performing a wide variety of general tasks. Foundation models are the result of the latest advancements in a technology that has been evolving for decades. In general, a foundational model uses learned patterns and relationships to predict the next item in a sequence. For example, with image generation, the foundational model analyzes the image and creates a sharper, more clearly defined version of the image. Similarly, with text, the foundational model predicts the next word in a string of text based on the previous words and their context. The foundational model then selects the next word using probability distribution techniques.

Large language models: Large language models (LLMs) are one class of foundational models. LLMs are specifically focused on language-based tasks such as such as summarization, text generation, classification, open-ended conversation, and information extraction.

FIG. 3 depicts a flowchart of a computer-implemented method 300 for automatically developing artificial prompts for AI engines on behalf of a user, by generating the artificial prompts based on a user prompt (or request), presenting the artificial prompts to the user as selectable options, causing a selected artificial prompt to be executed by AI engines, and/or presenting the response of the AI engines to the user according to one or more embodiments.

At block 302 of the computer-implemented method 300, the software 204 is configured to receive a user prompt 254 from a user device 252 of a user and/or a user request for generating the user prompt 254. The user prompt 254 is the original prompt input by the user on the user device 252. For example, when a user inputs or sends a prompt, the prompt is captured by an intermediary such as the software 204 according to one or more embodiments. In one or more embodiments, the user device 252 can push the user prompt to the software 204, and/or the software 204 can pull the user prompt from the user device 252. For example, a user of the user device 252 may send a user prompt and/or select to send the user prompt to an AI engine 244 but the software 204 receives the prompt instead. In one or more embodiments, the user software 220 may send or push the user prompt to the software 204 in place of the AI engine 244. In one or more embodiments, the user software 220 can cause the user prompt to be intercepted and sent to the software 204, which can then send an artificial prompt to the AI engine 244 as discussed herein. In one or more embodiments, a copy of the user prompt is sent from the user software 220 to the software 204. In one or more embodiments, the software 204 can capture the user prompt even if the user prompt is still sent to the AI engine 244.

In one or more embodiments, an organization may have subscribed to AI services provided by the computer systems 240A, 240B, and 240N such that users can utilize the AI services provided by AI engines 244A, 244B, and 240N. By permission of the organization of the computer system 202, the user of user device 252 can be authorized to employ the AI services of computer systems 240. For example, the user of user device 252 can be given an organizational account that allows the user to access AI services of the computer systems 240 in accordance with the predetermined subscription of the organization.

At blocks 304 and 306, in response to receiving the user prompt 254 or a request to create the user prompt 254, the software 204 is configured to cause manual extraction to be performed on the user prompt 254 or on the request for a user prompt, by querying the user for information regarding the desired user prompt. In one or more embodiments, the software 204 can call and/or be integrated with a manual extraction module 262 having computer-executable instructions with rules-based logic to perform manual extraction of information regarding the user prompt 254 or the request for the user prompt 254. The software 204, which includes the manual extraction module 206, is configured to interact with the user of user device 252 and request information to improve the user prompt 254 and/or to generate the user prompt 254. In one or more embodiments, the request for information can be generated in a graphical user interface that is presented on the user device 252.

Example information requested of the user by the software 204 during manual extraction can include any of the following questions presented on the user device 252:

1) Role: How do you wish for the AI engine 244 to respond, for example, as an expert developer, as an attorney, as a teacher, as a subject matter expect, as a combination of roles, etc.

2) Result: What is your desired presentation of the outcome, for example, provide the output as a list, as a table, as bulleted data, as a summary, as a poem, as a song (or music), as an image, as plain text, a video, as a combination of different types of responses, etc.

3) Intent: What is the intent/purpose of your request, for example, to create an analysis, create a story, create a song, create a summary for an adolescent, create a scientific paper, etc.

4) Entities: What are the context and additional relevant information to enhance the output, for example, what are characteristics, adjectives, background information, etc. For example, what is the object of that your intent is directed to.

5) Exclusions/Constraint/Negatives: What data should not be included in the output. For example, create lyrics to a song that instructs passengers about the safety benefits of using a seatbelt in a vehicle but exclude the word speed because accidents can occur at any speed.

6) Output example: What is an example of the output expected by the user. For example, the user can input the manner in which the output is expected. This will be used to create the prompt using reverse prompt engineering.

The software 204 is configured to receive the answers to the requested information from the user of user device 252. The user can input the answers to the questions using the user device 252. For example, the requested information can be input to the user device 252 by text, by voice, by gestures, by video, etc., such that the software 204 can receive the requested information. In one or more embodiments, the software 204 may translate and/or call an algorithm (e.g., a speech-to-text algorithm) to translate the requested information from the user device 252 into a suitable format for further processing.

At block 314, in response to performing blocks 304 and 306, the software 204 is configured to cause reverse prompt engineering to be performed using the requested information received from the user of the user device 252 with or without the user prompt 254. As noted above, the user can input a request to generate the user prompt 254 without actually inputting the user prompt itself, or the user can provide the user prompt 254. In one or more embodiments, the software 204 instructs an internal LLM 272 to generate a user prompt 254 with the requested information provided by the user. In one or more embodiments, the software 204 instructs the internal LLM 272 to update/improve the user prompt 254 with the requested information provided by the user. In either case, the internal LLM 272 generates and outputs the user prompt 254 based on the requested information and/or outputs an updated/improved version of the user prompt 254 based on the requested information.

The software 204 can use reverse prompt engineering techniques, which are the creation of a prompt from text, thereby creating prompts based on the requested information received from the user of the user device 252 (with or without the user prompt 254). Then, these prompts are used as a baseline to generate the artificial prompts discussed further herein. In one or more embodiments, it is noted that block 314 is optional and may be omitted.

At blocks 308, 310, and 312, in response to receiving the user prompt 254, the software 204 is configured to cause automated extraction to be performed on the user prompt 254, which includes extracting the intent and the entities in the user prompt 254. As noted herein, the intent is the actual purpose of the request, for example, to create an analysis, create a story, create a song, create a summary for an adolescent, create a scientific paper, etc. The entity is what is acted upon by the intent, for example, the context and additional relevant information to enhance the output, such as what are characteristics, adjectives, background information, etc., of the user prompt 254.

Figure 4:
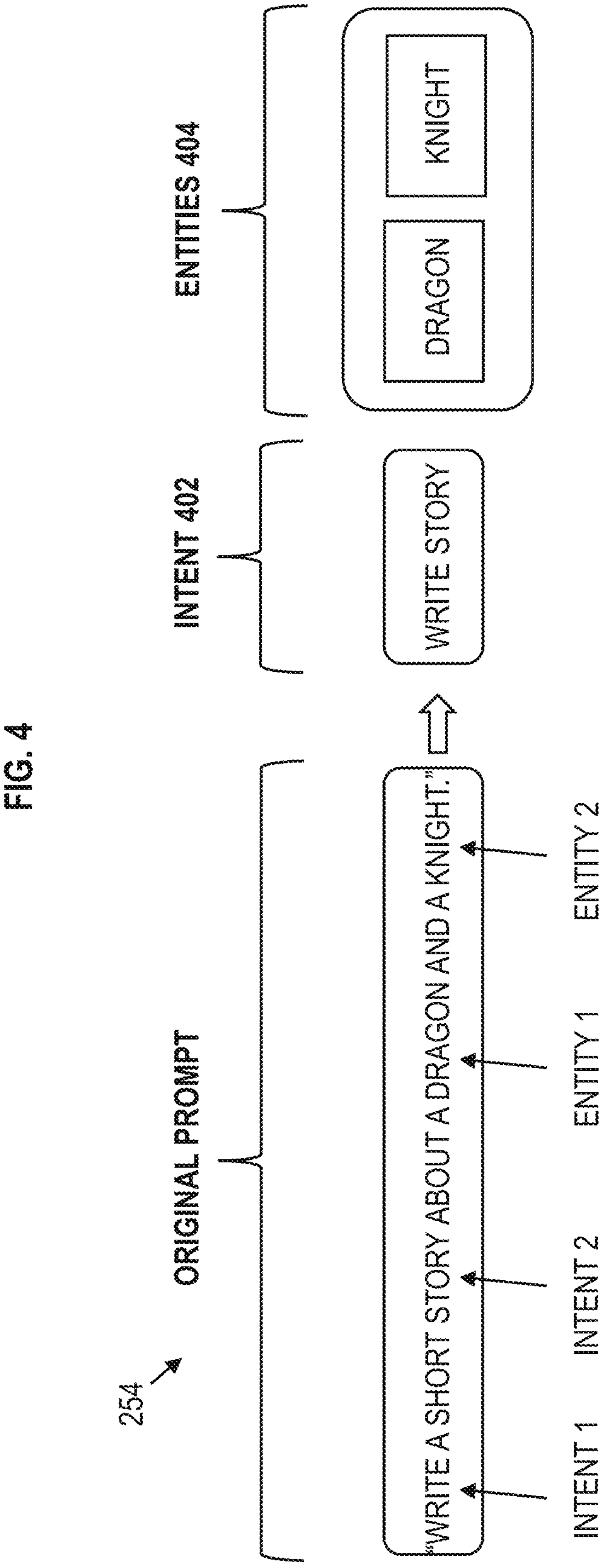
FIG. 4 depicts an example illustration of automated extraction according to one or more embodiments of the present invention.

The software 204 can call, request, and/or instruct an NLP model 210 to determine and extract the intent and entities in the user prompt 254 and output the same. FIG. 4 depicts an example illustration of automated extraction according to one or more embodiments. In this example, the original prompt (e.g., user prompt 254) from the user is "Write a short story about a dragon and a knight." The intent and entities are identified in the user prompt 254. As shown in FIG. 4, intent 1 and intent 2 have been identified along with entity 1 and entity 2. The NLP model 210 can output intent 402 which is "write story" and entities 404 which are "dragon" and "night," as depicted in FIG. 4. The intent and entities are utilized in further processing as discussed herein.

Referring to FIG. 3, the flow can proceed to block 314, in response to performing blocks 308, 310, and 312, the software 204 is configured to cause reverse prompt engineering to be performed using identified intent 402, the identified entities 404, and the user prompt 254. In one or more embodiments, the software 204 instructs an internal LLM 272 to update/improve the user prompt 254 using the identified intent 402 and identified entities 404 of the user prompt 254, which results in an improved user prompt 254. It is noted that block 314 is optional, particularly for automated extraction, and may be omitted.

At block 316, the software 204 is configured to perform word variation for the intent and entities of the user prompt 254. As recalled from above, the manual extraction and the automated extraction both output the intent and entities of the user prompt 254. The software 204 can perform a search and/or cause a search to be performed, for example, using a search algorithm, for variations of the intent and entities. In one or more embodiments, the search algorithm can search a database, a knowledge base, the Internet, etc., for synonyms of the identified intent and identified entities. In one or more embodiments, any suitable search algorithm may be utilized to search for synonyms for the intent and entities. In one or more embodiments, the NLP model 210 can be requested to output synonyms for the intent and entities in the context of the user prompt 254.

At block 318, the software 204 is configured to optionally create a prompt chain. For example, the software 204 can divide the user prompt 254 into several smaller prompts (or blocks) and then request the internal LLM 272 to chain the smaller prompts into a single, more robust user prompt 254. In one or more embodiments, the software 204 may divide the user prompt 254 into smaller prompts (or blocks) based on rules-based logic.

At block 320, the software 204 is configured to perform corporate language translation for any organizational terms such as acronyms, abbreviations, etc., that are unique or particular to the organization and used in the user prompt 254. The software 204 and/or a search algorithm can scan the user prompt 254 for organizational terms (e.g., such as acronyms, abbreviations, etc.) that are specific to the organization and replace the organization terms with their full meaning. In some cases, the software 204 may access a repository 286 of internal data of the organization to find and replace the organizational terms with their full meaning.

Organizations including companies, corporations, schools, government entities, etc., use hundreds of acronyms that are only known internally by its employees and one common issue is that users may include those terms in the prompt. However, AI models (such as LLMs) may misunderstand the meaning of the organizational terms because these AI models are external are to and not trained with organizational/corporate data. Therefore, the software 204 is configured to identify the organizational terms (e.g., such as acronyms, abbreviations, etc.) in the initial request or user prompt 254 and compare the organizational terms against the internal database of repository 286. If any match is found, the software 204 translates the organizational terms (e.g., such as acronyms, abbreviations, etc.) into their full meaning which provides the full data to the AI engine for its processing, thereby allowing the AI engine to provide more accurate results. In some instances, the organizational terms may include alphabets and numbers having a specific meaning withing the organization.

At block 322, the software 204 is configured to perform entity enhancement on the entities. The software 204 is configured to add modifiers such as adjectives and superlatives to the entities to enhance the scope of the user prompt 254. In one or more embodiments, the software 204 is configured to instruct, for example, the internal LLM 272 and/or a sentiment analysis engine 274 to first identify the tense of the sentence (e.g., positive or negative tense/sentiment) and then add the superlatives and adjectives accordingly to the entities. For example, the original prompt "write a story about a horse" can be changed to "write an amazing story about a beautiful horse", "write a story about an amazing horse", "write a story about a wild horse", etc. These are enhancements to the user prompt. That is, enhancements are the added superlatives and adjectives to the entities in accordance with the tense (e.g., positive or negative tense/sentiment) in the user prompt.

At block 324, the software 204 is configured to cause artificial prompts 264 to be generated in preparation for review by the user. The software 204 is configured to input the identified intent, identified entities, synonyms of the intent and entities, enhancements of the entities, the full meaning of terms from the internal database, the user prompt 264, and instructions to generate artificial prompts 264 based on the same into the internal LLM 272. Accordingly, the internal LLM 272 outputs the artificial prompts 264 based on the input data and the instructions.

At block 326, the software 204 is configured to output the artificial prompts 264 as selectable options on the user device 252 to the user. The selectable options of artificial prompts can be presented on a user interface as a graphical display, as voice options, as video, etc. According to one or more embodiments, FIG. 5 depicts a block diagram displaying of selectable options of different artificial prompts. Continuing the example scenario from above, user prompt 254 is "Write a short story about a dragon and a knight." In the user interface 500 of FIG. 5, there are three selectable options displayed on the user device 252. For each selectable option of an artificial prompt, there are selectable buttons 502 and 504 in this example. More or fewer selectable options and selectable buttons can be utilized. In one or more embodiments, the top five selectable options can be presented to the user, ranked from highest to lowest. The software 204 can instruct NLP 210 and/or the internal LLM 272 to rank the selectable options of the artificial prompts 264 from highest to lowest based on the intent of the user (e.g., based on the user prompt 254).

In FIG. 5, the selectable button 502 allows the user to select and submit the corresponding artificial prompt. The selectable button 504 allows the user to select and edit the corresponding artificial prompt. After opening a text box for editing the corresponding artificial prompt, the user can then select the selectable button 502 to submit the edited artificial prompt. In one or more embodiments, the selectable options can be selected such that two artificial prompts 264 are combined. Although the software 204 can cause the example user interface 500 to be displayed on the user device 252 for the user, the user interface 500 can be modified and changed as desired with more or less functionality.

Referring to FIG. 3, at block 328, the software 204 is configured to receive a selected option of an artificial prompt 256 from the user device 252 of the user. In one or more embodiments, the selected option of the artificial prompt 256 (from the artificial prompts 264) may be edited or not edited prior to sending to the computer system 202.

At blocks 330 and 332, the software 204 is configured to cause the (selected) artificial prompt 256 to be input to the AI engines 244 to output a response and present the response 258 to the user of the user device 252. The response 258 can be visually displayed, presented as audio, video, etc., and/or presented as a holographic display on the user device 252. In one or more embodiments, the software 204 can communicate with the user software 220 to cause the artificial prompt 256 to be sent to the AI engines 244 and cause the response 258 to be presented/rendered on the user device 252. In one or more embodiments, the selection of the selectable buttons 502 and 504 in the user interface 500 can instruct the user software 220 to send the selected option of the artificial prompt 256 to the AI engines 244 on computer systems 240, such that the response 258 is received and presented on the user device 252.

The internal LLM 272 can be pretrained based on a large corpus. Further, during a training phase, the LLM 272 can be further trained on training data 270 in a repository. The training data 270 includes historical data of the identified intent, identified entities, synonyms of the intent and entities, enhancements of the entities, the full meaning of terms from the internal database, the user prompt 264, and instructions to generate artificial prompts. This results in a trained machine learning model. As reinforced learning, the LLM 272 can be rewarded or penalized based on whether the given artificial prompt was selected or not by the user, and the corresponding data (e.g., identified intent, identified entities, synonyms of the intent and entities, enhancements of the entities, the full meaning of terms from the internal database, the user prompt, and instructions) resulting in the given artificial prompt is resubmitted back to the LLM 272 along with the user prompt used by the user. In cases when the given artificial prompt is edited by the user before submitting, the edited artificial prompt is utilized as training data along with its corresponding data used to create the artificial prompt. This further training continuously improves the internal LLM 272.

FIG. 6 depicts a flowchart of a computer-implemented method 600 for automatically (in real-time or near real-time) developing artificial prompts for AI engines on behalf of a user, by generating the artificial prompts based on the user prompt (or request), presenting the artificial prompts to the user as selectable options, causing a selected artificial prompt to be executed by AI engines, and/or presenting the response of the AI engines according to one or more embodiments.

In one or more embodiments, the computer-implemented method 600 can be executed by the computer system 202 on behalf of and in conjunction with the user device 252. The user device 252 can communicate with the computer system 202 in order to cause the computer system 202 to assist with execution of one or more tasks, for example, in a client-server relationship. The computer system 202 can return one or more responses of AI engines to the user device 252 and/or cause one or more responses of AI engines to be returned to the user device 252, for example, by causing the user device 252 to display the responses in a graphical user interface. Reference can be made to any figures discussed herein.

Turning to FIG. 6, at block 602 of the computer-implemented method 600, the software 204 of computer system 202 is configured to receive a user prompt (e.g., user prompt 254). At block 604, the software 204 is configured to use, natural language processing (e.g., NLP model 210), to identify at least one intent (e.g., intent 402) in the user prompt and at least one entity (e.g., entity 404) in the user prompt. At block 606, the software 204 is configured to enhance the at least one entity with enhancements. At block 608, the software 204 is configured to input the user prompt, the at least one intent, the at least one entity, and the enhancements into an internal language model 272 in order to output artificial prompts 264. At block 610, the software 204 is configured to present the artificial prompts 264 in order to receive a selected artificial prompt of the artificial prompts, the selected artificial prompt being configured for input to an artificial intelligence (AI) engine 244.

According to one or more embodiments, the software 204 is configured to determine word variations for the at least one intent and the at least one entity. The word variations are also input into the internal language model 272 in order to output the artificial prompts 264.

In some embodiments, a sentiment of the user prompt is determined, for example, using the NLP model 210 and/or the sentiment analysis algorithm 274. The enhancements for the at least one entity are generated in accordance with the sentiment being positive or negative; and the enhancements include at least one of an adjective or a superlative associated with the at least one entity.

The user prompt 264 is checked for terms internal to an organization (e.g., in an internal database of a repository 286 of an organization); and in response to finding at least one term internal to the organization, the at least one term is replaced with a full meaning of the least one term in the user prompt.

The software 204 is configured to cause an output of the AI engine 244 of computer system 240 to be rendered on a user device 252 such that the output is in accordance with the selected artificial prompt 264.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
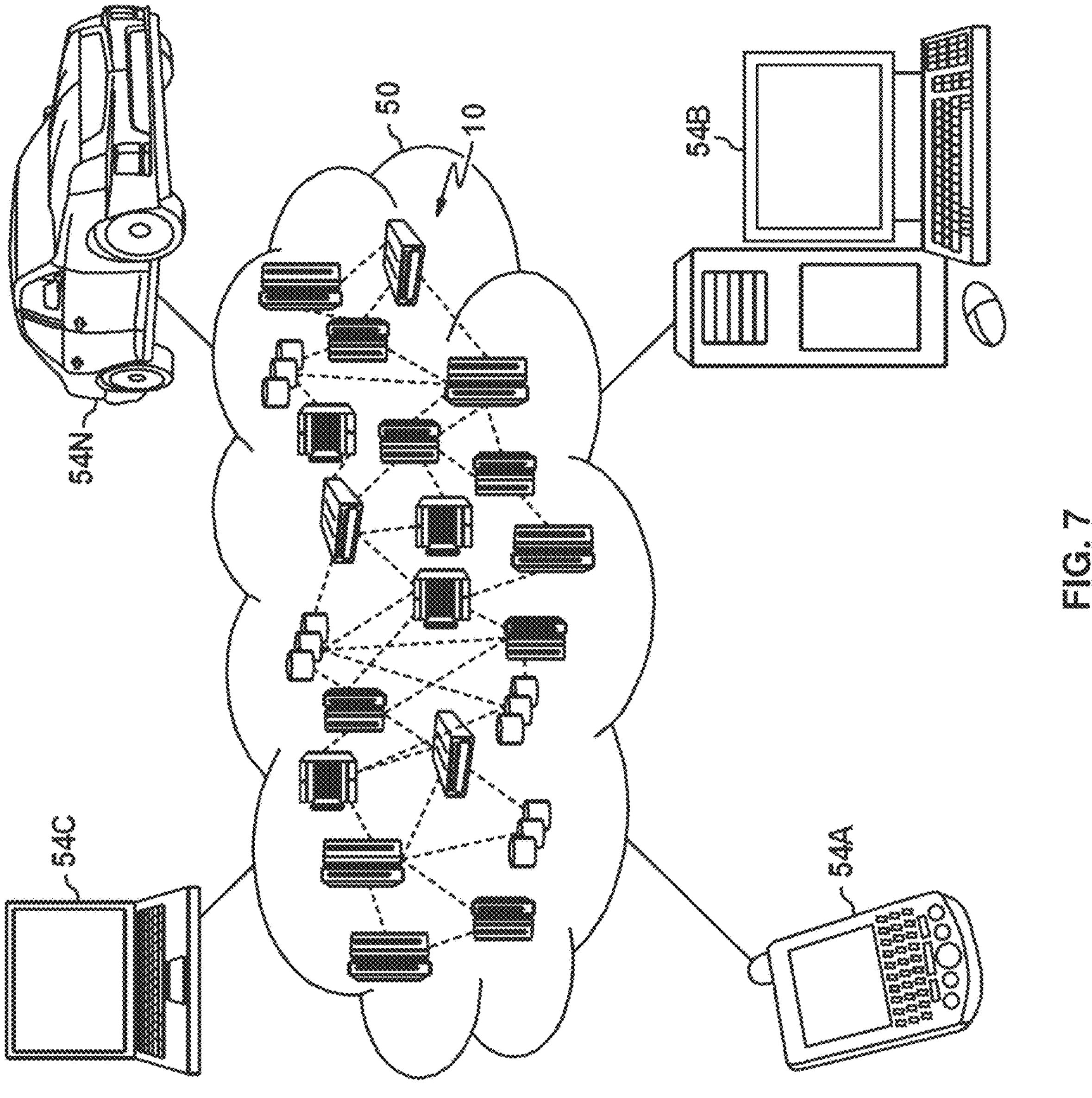
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
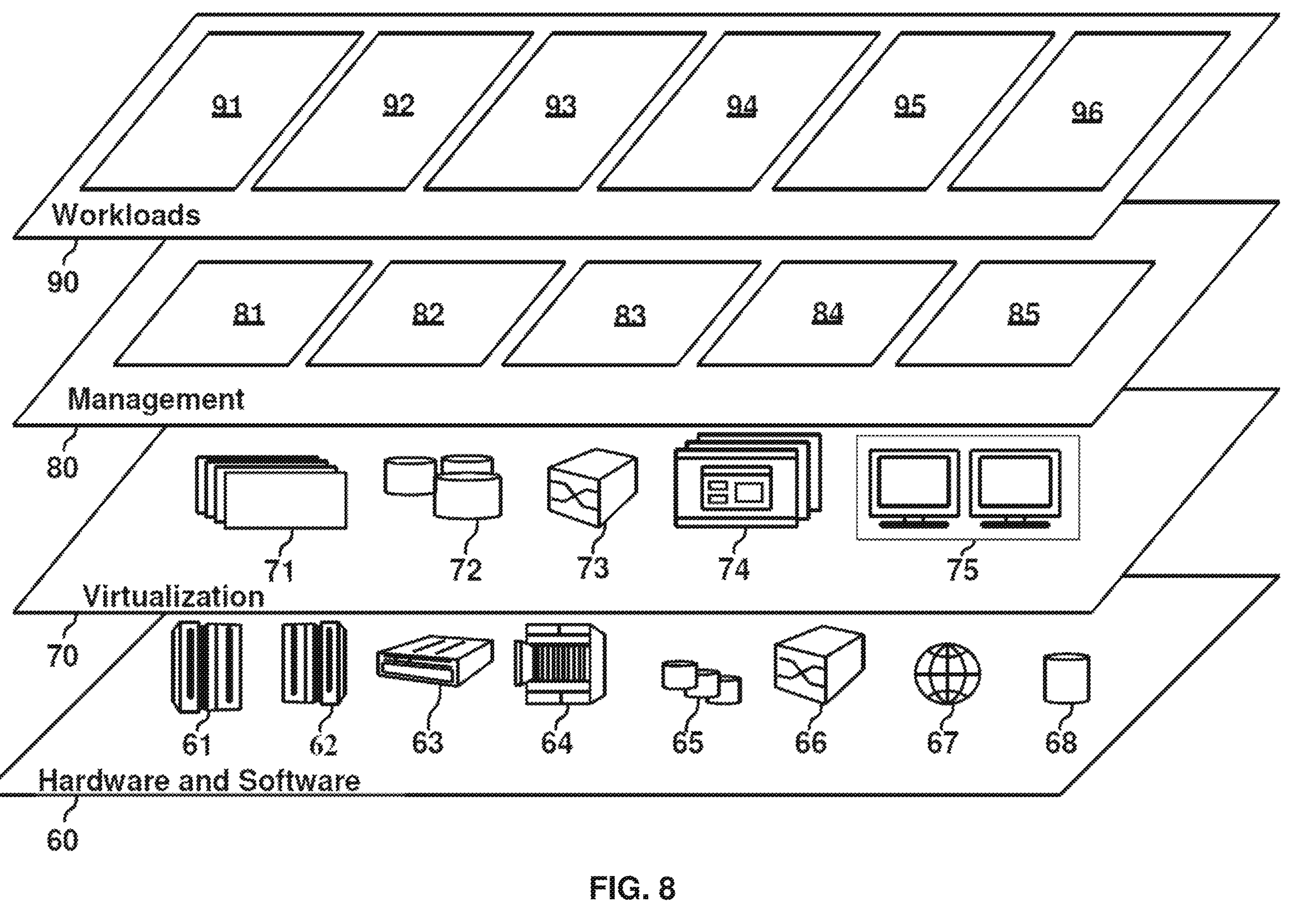
FIG. 8 depicts abstraction model layers according to one or more embodiments of the present invention.

Referring now to FIG. 8, a set of functional abstraction layers provided by cloud computing environment 50 (depicted in FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. U ser portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. One or more aspects of embodiments may be executed, at least in part, by workloads and functions 96. In one or more embodiments, the software 204, NLP model 210, manual extraction module 262, internal LLM 272, sentiment analysis algorithm 274, AI engines 244, etc., can utilize, be executed as, and/or be integrated with workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for the purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagrams or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, e.g., one, two, three, four, etc. The terms "a plurality" are understood to include any integer number greater than or equal to two, e.g., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. M any modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

receiving a user prompt from a user device authorized by an organization to access an artificial intelligence (AI) engine;

using, natural language processing, to identify at least one intent in the user prompt and at least one entity in the user prompt;

enhancing the at least one entity with enhancements by software, stored in memory, inputting the at least one entity into a sentiment analysis engine and instructing the sentiment analysis engine to generate the enhancements;

executing a search algorithm to scan the user prompt for terms internal to the organization in order to find at least one term internal to the organization in a repository of internal data of the organization;

in response to finding the at least one term internal to the organization, accessing the repository of the internal data of the organization to replace the at least one term with a full meaning of the at least one term in the user prompt;

inputting the user prompt, the at least one intent, the at least one entity, and the enhancements into an internal language model in order to output artificial prompts;

presenting the artificial prompts to the user device to be selected;

receiving a selected artificial prompt of the artificial prompts from the user device;

sending the selected artificial prompt as input to the AI engine; and causing a response of the AI engine to be output on the user device as at least one of a visual output, an audio output, a video output, and a holographic output.

2. The computer-implemented method of claim 1, further comprising determining word variations for the at least one intent and the at least one entity.

3. The computer-implemented method of claim 2, wherein the word variations are also input into the internal language model in order to output the artificial prompts.

4. The computer-implemented method of claim 1, wherein a sentiment of the user prompt is determined.

5. The computer-implemented method of claim 4, wherein:

the enhancements for the at least one entity are generated in accordance with the sentiment being positive or negative; and the enhancements comprise at least one of an adjective or a superlative associated with the at least one entity.

6. The computer-implemented method of claim 1, wherein receiving the user prompt from the user device authorized by the organization to access the AI engine comprises intercepting the user prompt intended for the AI engine.

7. The computer-implemented method of claim 1, further comprising causing an output of the AI engine to be rendered on a user device such that the output is in accordance with the selected artificial prompt.

8. A system comprising:

one or more memories having computer readable instructions; and one or more processors for executing the computer readable instructions, the computer readable instructions when executed cause the one or more processors to perform operations comprising:

receiving a user prompt from a user device authorized by an organization to access an artificial intelligence (AI) engine;

using, natural language processing, to identify at least one intent in the user prompt and at least one entity in the user prompt;

enhancing the at least one entity with enhancements by software, stored in one or more of the memories, inputting the at least one entity into a sentiment analysis engine and instructing the sentiment analysis engine to generate the enhancements;

executing a search algorithm to scan the user prompt for terms internal to the organization in order to find at least one term internal to the organization in a repository of internal data of the organization;

in response to finding the at least one term internal to the organization, accessing the repository of the internal data of the organization to replace the at least one term with a full meaning of the at least one term in the user prompt;

inputting the user prompt, the at least one intent, the at least one entity, and the enhancements into an internal language model in order to output artificial prompts;

presenting the artificial prompts to the user device to be selected;

receiving a selected artificial prompt of the artificial prompts from the user device;

sending the selected artificial prompt as input to the AI engine; and causing a response of the AI engine to be output on the user device as at least one of a visual output, an audio output, a video output, and a holographic output.

9. The system of claim 8, wherein the one or more processors perform the operations further comprising determining word variations for the at least one intent and the at least one entity.

10. The system of claim 9, wherein the word variations are also input into the internal language model in order to output the artificial prompts.

11. The system of claim 8, wherein a sentiment of the user prompt is determined.

12. The system of claim 11, wherein:

the enhancements for the at least one entity are generated in accordance with the sentiment being positive or negative; and the enhancements comprise at least one of an adjective or a superlative associated with the at least one entity.

13. The system of claim 8, wherein receiving the user prompt from the user device authorized by the organization to access the AI engine comprises intercepting the user prompt intended for the AI engine.

14. The system of claim 8, the one or more processors perform the operations further comprising causing an output of the AI engine to be rendered on a user device such that the output is in accordance with the selected artificial prompt.

15. A computer program product comprising a computer readable storage medium having program instructions embodied therewith, the program instructions executable by one or more processors to cause the one or more processors to perform operations comprising:

receiving a user prompt from a user device authorized by an organization to access an artificial intelligence (AI) engine;

using, natural language processing, to identify at least one intent in the user prompt and at least one entity in the user prompt;

enhancing the at least one entity with enhancements by software, stored in memory, inputting the at least one entity into a sentiment analysis engine and instructing the sentiment analysis engine to generate the enhancements;

executing a search algorithm to scan the user prompt for terms internal to the organization in order to find at least one term internal to the organization in a repository of internal data of the organization;

in response to finding the at least one term internal to the organization, accessing the repository of the internal data of the organization to replace the at least one term with a full meaning of the at least one term in the user prompt;

inputting the user prompt, the at least one intent, the at least one entity, and the enhancements into an internal language model in order to output artificial prompts;

presenting the artificial prompts to the user device to be selected;

receiving a selected artificial prompt of the artificial prompts from the user device;

sending the selected artificial prompt as input to the AI engine; and causing a response of the AI engine to be output on the user device as at least one of a visual output, an audio output, a video output, and a holographic output.

16. The computer program product of claim 15, wherein the one or more processors perform the operations further comprising determining word variations for the at least one intent and the at least one entity.

17. The computer program product of claim 16, wherein the word variations are also input into the internal language model in order to output the artificial prompts.

18. The computer program product of claim 15, wherein a sentiment of the user prompt is determined.

19. The computer program product of claim 18, wherein:

the enhancements for the at least one entity are generated in accordance with the sentiment being positive or negative; and the enhancements comprise at least one of an adjective or a superlative associated with the at least one entity.

20. The computer program product of claim 15, wherein receiving the user prompt from the user device authorized by the organization to access the AI engine comprises intercepting the user prompt intended for the AI engine.

* * * * *